(12) United States Patent
Chiu et al.

(10) Patent No.: US 7,274,353 B2
(45) Date of Patent: Sep. 25, 2007

(54) CAPACITIVE TOUCHPAD INTEGRATED WITH KEY AND HANDWRITING FUNCTIONS

(75) Inventors: Yen-Chang Chiu, Taipei (TW); Ting-Hao Yeh, Tainan (TW); Yung-Lieh Chien, Taoyuan (TW); Shih-Chi Lin, Madou Township, Tainan County (TW)

(73) Assignee: Elan Microelectronics Corporation, Hsin-Chu (TW)

(*) Notice: Subject to any disclaimer, the term of this patent is extended or adjusted under 35 U.S.C. 154(b) by 425 days.

(21) Appl. No.: 10/668,352

(22) Filed: Sep. 24, 2003

(65) Prior Publication Data

US 2004/0196270 A1 Oct. 7, 2004

(30) Foreign Application Priority Data

Apr. 2, 2003 (TW) .............................. 92205217 U

(51) Int. Cl.
G09G 5/00 (2006.01)
(52) U.S. Cl. ...................... 345/156; 345/173; 345/174; 345/178; 345/179
(58) Field of Classification Search ........ 345/156–159, 345/163–169, 173–179, 773; 379/90.01; 709/205; 178/18.01–18.06; 341/20; 364/188; 340/711; 438/674; 365/49; 361/524; 435/287.1
See application file for complete search history.

(56) References Cited

U.S. PATENT DOCUMENTS

| | | | |
|---|---|---|---|
| 4,745,543 A * | 5/1988 | Michener et al. ............. 700/83 |
| 4,885,574 A * | 12/1989 | Negishi et al. ............. 345/174 |
| 5,402,151 A * | 3/1995 | Duwaer ....................... 345/173 |
| 5,543,589 A * | 8/1996 | Buchana et al. ......... 178/18.03 |
| 5,790,114 A * | 8/1998 | Geaghan et al. ............ 715/763 |
| 5,869,791 A * | 2/1999 | Young ..................... 178/20.01 |
| 6,002,389 A * | 12/1999 | Kasser ....................... 345/173 |
| 6,088,022 A * | 7/2000 | Rakoski ...................... 345/168 |
| 6,340,588 B1 * | 1/2002 | Nova et al. .............. 435/287.1 |
| 6,417,846 B1 * | 7/2002 | Lee ............................. 345/173 |
| 6,459,424 B1 * | 10/2002 | Resman ...................... 345/173 |
| 6,642,857 B1 * | 11/2003 | Schediwy et al. ............ 341/20 |
| 6,850,229 B2 * | 2/2005 | Casebolt et al. ............ 345/173 |
| 6,888,536 B2 * | 5/2005 | Westerman et al. ......... 345/173 |
| 7,030,860 B1 * | 4/2006 | Hsu et al. .................... 345/173 |
| 7,030,862 B2 * | 4/2006 | Nozaki ....................... 345/173 |
| 2002/0015024 A1 * | 2/2002 | Westerman et al. ......... 345/173 |
| 2003/0006975 A1 * | 1/2003 | Moriya et al. .............. 345/179 |
| 2003/0069931 A1 * | 4/2003 | Omura et al. ............... 709/205 |
| 2003/0076649 A1 * | 4/2003 | Speakman .................. 361/524 |
| 2004/0021691 A1 * | 2/2004 | Dostie et al. ............... 345/773 |
| 2004/0119700 A1 * | 6/2004 | Ichikawa .................... 345/173 |
| 2004/0125947 A1 * | 7/2004 | Charlier et al. ........ 379/433.07 |
| 2004/0151014 A1 * | 8/2004 | Speakman .................... 365/49 |
| 2005/0001821 A1 * | 1/2005 | Low ............................ 345/169 |

(Continued)

Primary Examiner—Bipin Shalwala
Assistant Examiner—Prabodh Dharia
(74) Attorney, Agent, or Firm—Rosenberg, Klein & Lee

(57) ABSTRACT

A capacitive touchpad integrated with key and handwriting functions is provided for operation in key, handwriting and mouse modes. Several regions are defined on the panel of the touchpad and have several patterns printed thereon for the operation modes thereby. In the key mode, the key patterns among the printed patterns simulate a keyboard. In the handwriting mode, the handwriting region among the defined regions serves to handwriting input. In the mouse mode, the defined regions provide a cursor moving region and a horizontal and vertical scroll bars for input operations.

12 Claims, 4 Drawing Sheets

U.S. PATENT DOCUMENTS

| | | |
|---|---|---|
| 2005/0024341 A1* | 2/2005 | Gillespie et al. ............ 345/173 |
| 2005/0099403 A1* | 5/2005 | Kraus et al. ................ 345/173 |
| 2005/0129199 A1* | 6/2005 | Abe ....................... 379/90.01 |
| 2005/0156881 A1* | 7/2005 | Trent et al. ................. 345/157 |
| 2007/0087564 A1* | 4/2007 | Speakman ................. 438/674 |

* cited by examiner

CAPACITIVE TOUCHPAD INTEGRATED WITH KEY AND HANDWRITING FUNCTIONS

FIELD OF THE INVENTION

The present invention relates generally to a capacitive touchpad, and, more particularly, to a capacitive touchpad integrated with key and handwriting functions.

BACKGROUND OF THE INVENTION

Touchpad is well known and widely used in various electronic products. Touchpad provides a simple, easy and cheap pointing device, such as those in laptop computer systems for mouse function. FIG. 5 shows a schematic diagram of the construction of a touchpad and the operational principle thereof, in which an insulator plate (not shown) is arranged on the top of the functional stack consisting of a ground plate 36, a layer of traces 38 along Y-axis, a layer of traces 40 along X-axis, all of them connected to a control circuit 46 apart from the panel 12. An equivalent capacitance 42 presents between the Y-axis trace 38 and the ground plate 36, and an equivalent capacitance 44 presents between the X-axis trace 40 and the ground plate 36. Once finger or conductor touching the panel 12, the control circuit 46 determines the touched position of the finger or conductor by sensing the change in capacitances of each corresponding traces 38 and 40 and responds for further process.

There are three types of touchpads, i.e., resistive, electromagnetic and capacitive. The capacitive touchpad was applied for touching mode monitors such as those in public Internet phones and guiding systems. However, the capacitive touchpad lacks of handwriting function. The resistive touchpad has been used for touching mode monitors such as the applications in personal digital assistants (PDA) and electronic dictionaries. Unfortunately, the resistive touchpad cannot be inputted by light touching of users' fingers. Currently, the modules available for handwriting recognitions and keypads on tablet PCs and electronic books are all implemented with resistive or electromagnetic touchpads. The resistive touchpad is operated only by focused-point pressing on its panel, and the electromagnetic touchpad is operated by a battered input pen.

In consideration of functionality and cost, the capacitive touchpad is obviously preferred over the resistive and electromagnetic touchpads. The operational principle of the capacitive touchpad employs the instant electric change produced by capacitive effect in response to a user's finger or conductor's touch onto the panel of the touchpad to detect the position the finger or conductor is touching. Unlike the electromagnetic touchpad, the capacitive touchpad is easy to interface for users and needs not a power-consumed input pen. On the other hand, interfacing onto the capacitive touchpad requires no focused pressed point as that to the resistive touchpad and thus gives the capacitive touchpad a longer lifetime. Moreover, the capacitive touchpad has simple construction, fewer components, and higher production yield, and as a result, lower cost is achieved for mass production thereby.

By the aforementioned illustration, obviously, the capacitive touchpad has more advantages than the other two. If the capacitive touchpad is modified to be integrated with more input functions, such as keyboard and handwriting, a low-cost and easy-to-use input interface could be provided.

SUMMARY OF THE INVENTION

An object of the present invention is to propose a capacitive touchpad integrated with key and handwriting functions.

According to the present invention, a capacitive touchpad integrated with key and handwriting functions can provide multiple operation modes, such as keypad, handwriting and mouse. The panel of the present touchpad is defined into several regions with plenty of patterns printed thereon for representing the interfaces corresponding to the operation modes. In the key mode, the key patterns among the printed patterns simulate a keyboard. In the handwriting mode, the handwriting region among the defined regions serves to handwriting input. In the mouse mode, the defined regions provide a cursor moving region and a horizontal and vertical scroll bars for input operations.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
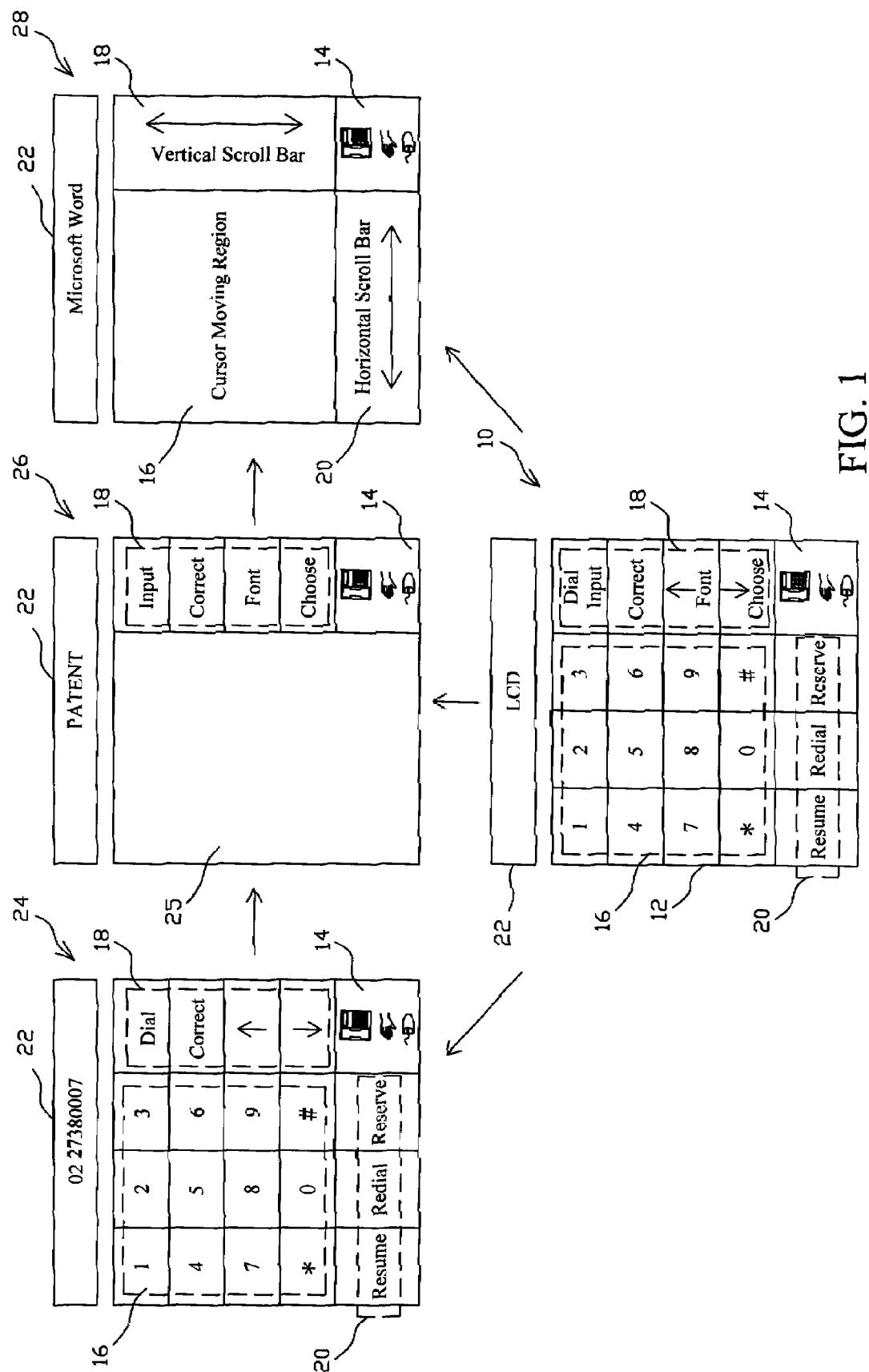
FIG. 1 is a schematic diagram of a capacitive touchpad according to the present invention and its key, handwriting and mouse modes.

FIG. 1 is an embodiment of the present invention. A touchpad 10 comprises a panel 12 for fingers or conductors to touch thereto for input, a mode switch pattern 14 on the panel 12 to switch the capacitive touchpad 10 to key, handwriting or mouse modes by touching thereon, virtual key regions 16, 18 and 20 defined on the panel 12, and a liquid crystal display (LCD) 22 to display the input data from said virtual key regions 16, 18 and 20. Those skilled in the art of the capacitive touchpad understand that the construction of the panel 12 mainly comprises an insulator plate on the top surface and a bottom substrate formed with a conductor wiring thereon. The conductor wiring can be made of metal or other conductive materials, such as indium tin oxide (ITO), and the substrate can be a printed circuit board (PCB), a membrane, or a transparent substrate. The hardware structure of the conventional panel is not the feature of the present invention, and a conventional panel can be modified to be the hardware for the invented touchpad.

When the touchpad 10 is switched to the key mode, the numbers, "#" and "*" key patterns on the virtual key region 16, the "Dial", "Correct" and up/down function key patterns on the key region 18, and the "Resume", "Redial" and "Reserve" function keys patterns on the virtual key region 20 are shown as numeric reference 24. The arrangement referred by 24 serves as an input device or interface of a telephone, and users can input the telephone number for dialing by touching the corresponding key patterns. The inputted telephone number is shown on the LCD 22 after processing the touched signals by software or hardware.

If the touchpad 10 is switched to the handwriting mode, the virtual key regions 16 and 20 become a handwriting region 25, corporating with the "Input", "Correct", "Font" and "Choose" function patterns on the virtual key region 18, as shown by number 26. This arrangement provides users for handwriting input. Users write on their input data or drawings by fingers or conductors in the handwriting region. After recognized by software or hardware, e.g., recognition module, the handwriting input, such as traces, words, and symbols, are shown on the LCD 22.

By switching the touchpad 10 to the mouse mode, the virtual key region 16 becomes a cursor moving region for users to control the cursor movement by touching on this region. Furthermore, the virtual key region 18 becomes a vertical scroll bar, and the virtual key region 20 becomes a horizontal scroll bar, as shown by numerous 28 in FIG. 1. The vertical and horizontal scroll bars provided by the virtual key regions 18 and 20 simulate the function that a mouse scrolls a window vertically and horizontally, as those in Microsoft Office word processing software. Further, a judgment module can be further added to determine the number of fingers touching on the panel 12, and thereby different instructions can be performed according to the number of the fingers. For example, a touching of two fingers represents a left click on a mouse, and a touching of three fingers represents a right click on a mouse.

Figure 2:
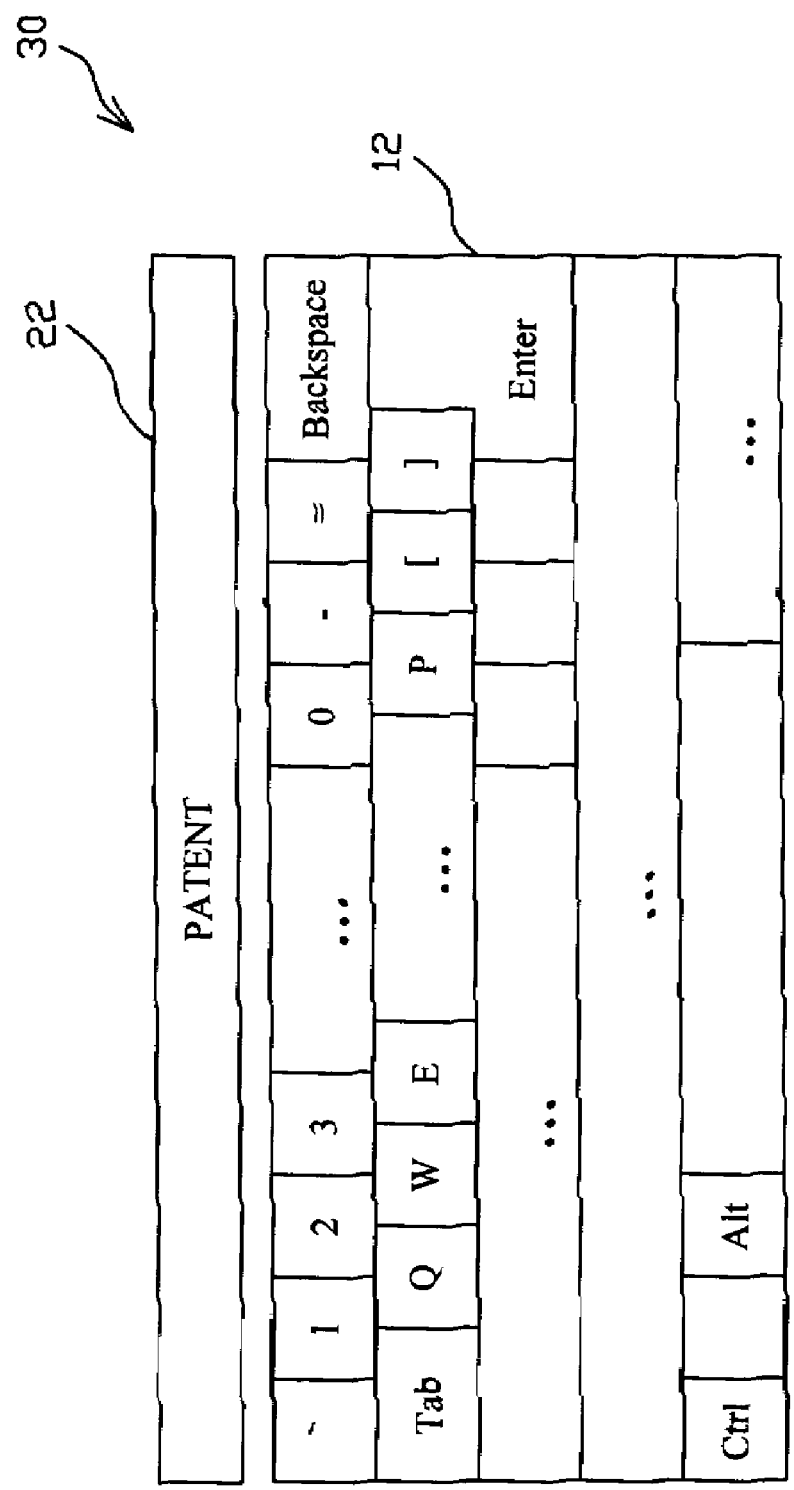
FIG. 2 is an embodiment of the present invention applied for a computer keyboard.

In other embodiments, the arrangement of the virtual key regions of the panel 12 in the key mode can be a computer keyboard 30, as shown in FIG. 2.

Figure 4:
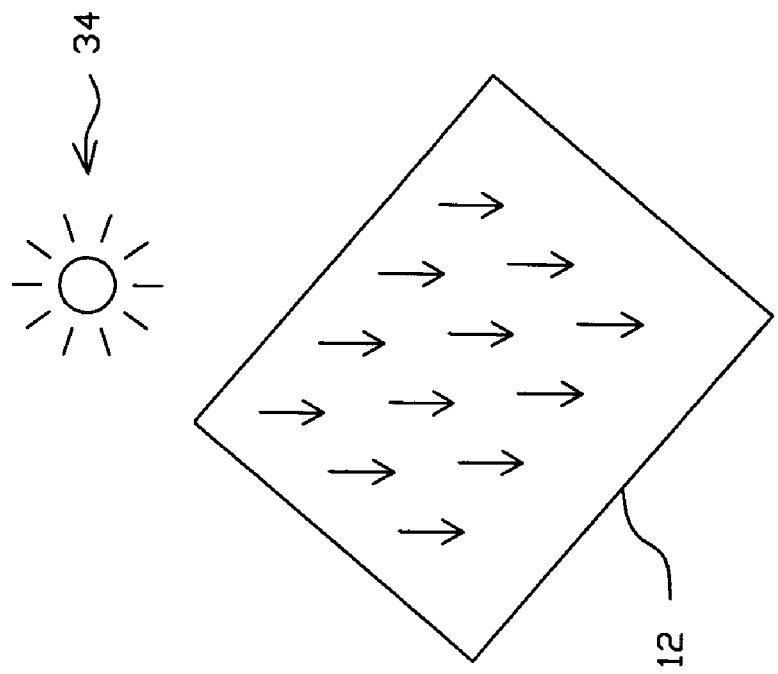
FIG. 4 is a schematic diagram of a capacitive touchpad of the present invention with a frontlight illumination.
Figure 3:
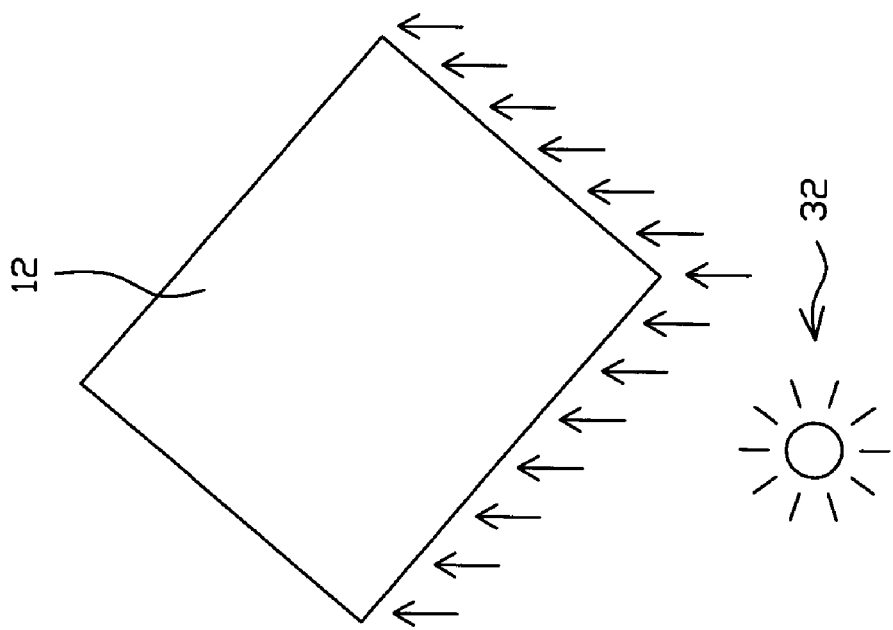
FIG. 3 is a schematic diagram of a capacitive touchpad of the present invention with a backlight illumination.
Figure 5:
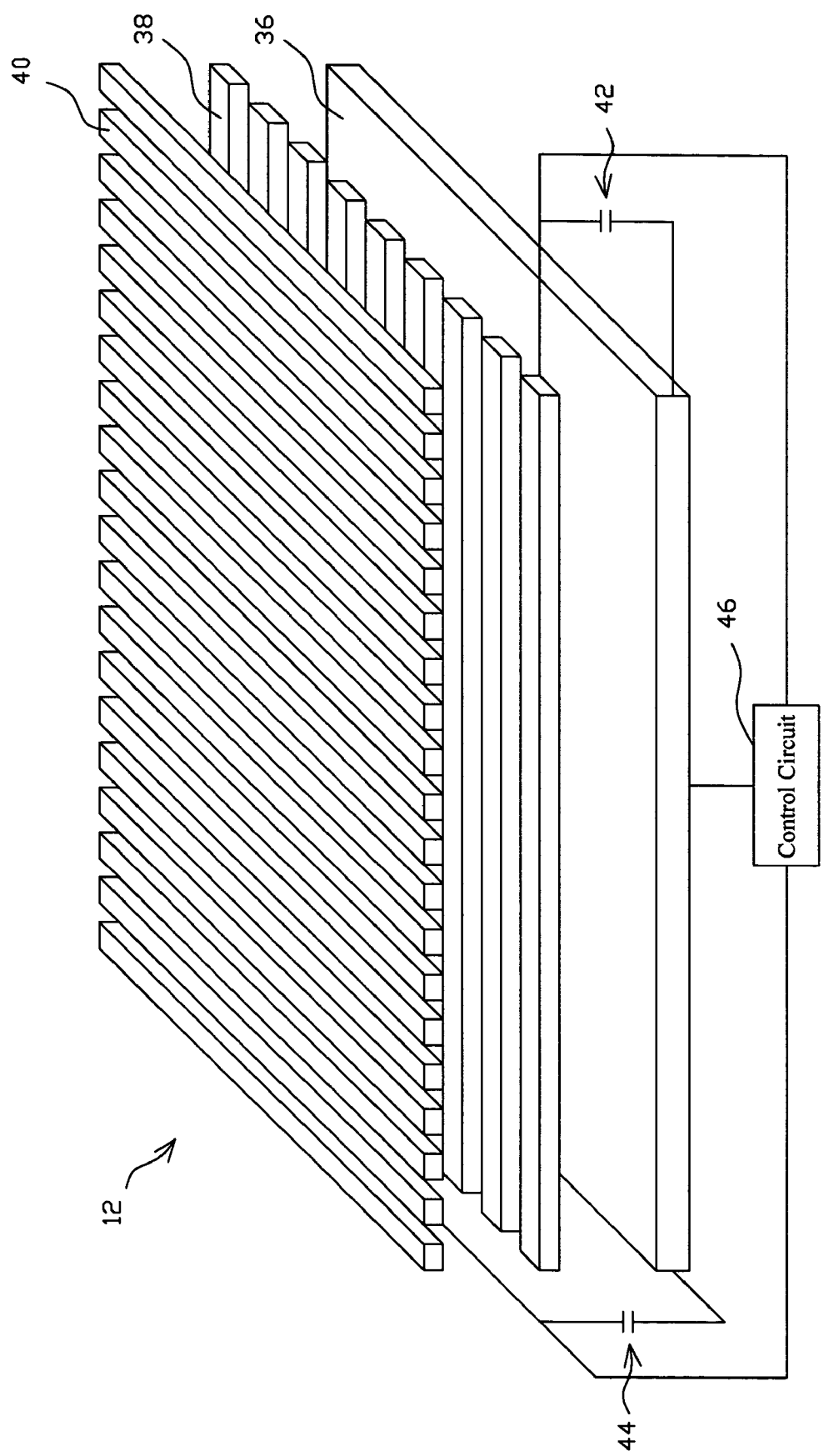
FIG. 5 shows a schematic diagram of the construction of a touchpad and the operational principle thereof.

Light source can be further provided for the panel 12. FIG. 3 shows a case where the panel 12 of the capacitive touchpad is transparent, such as glass, and a backlight 32 is provided for the panel 12 from the backside of the panel 12 to improve the words or drawings displayed thereon. In FIG. 4, it is provided a frontlight 34 for the panel 12 from the frontside of the panel 12 to enhance the words or drawings display.

Usually, the key, word and symbol patterns to represent any number or function keys are printed on the insulator plate on the top of the panel 12. However, variations or modifications are possible within the scope of the present invention.

Application for input device or interface of any apparatus, such as mobile phone, public Internet phone, computer keyboard, PDA, information appliance (IA) and electronic dictionary, the advantages of the present invention become much clearly. Especially using on cellular phones, the input function of the phones can be increased enormously with decreased thickness, and the cost is cheaper compared to the keypad module in conventional cellular phones.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitive touchpad integrated with key and handwriting functions, comprising:
a panel for touch inputting;
   a first pattern on said panel for representing a mode switch to switch said touchpad between a key mode and a handwriting mode;
   a plurality of regions defined on said panel; and
   a plurality of second patterns on said plurality of regions for operation in said key and handwriting modes;
   wherein said panel comprises:
      a substrate selected from the group consisting of PCB, membrane and transparent plate;
      a conductor wiring on said substrate; and
      an insulator covered on said conductor wiring.

2. A capacitive touchpad of claim 1, wherein said conductor wiring comprises an ITO.

3. A capacitive touchpad of claim 1, wherein said insulator is transparent.

4. A mobile telephone characterized in a capacitive touchpad included thereon, said capacitive touchpad comprising:
   a panel for touch inputting;
   a first pattern on said panel for representing a mode switch to switch said touchpad between a key mode and a handwriting mode;
   a plurality of regions defined on said panel; and
   a plurality of second patterns on said plurality of regions for operation in said key and handwriting modes;
   wherein said panel comprises:
      a substrate selected from the group consisting of PCB, membrane and transparent plate;
      a conductor wiring on said substrate; and
      an insulator covered on said conductor wiring.

5. A mobile telephone of claim 4, wherein said conductor wiring comprises an ITO.

6. A mobile telephone of claim 4, wherein said insulator is transparent.

7. A capacitive touchpad integrated with key and mouse functions, comprising:
   a panel for touch inputting;
   a first pattern on said panel for representing a mode switch to switch said touchpad between a key mode and a mouse mode;
   a plurality of regions defined on said panel; and
   a plurality of second patterns on said plurality of regions for operation in said key and mouse modes;
   wherein said panel comprises:
      a substrate selected from the group consisting of PCB, membrane and transparent plate;
      a conductor wiring on said substrate; and
      an insulator covered on said conductor wiring.

8. A capacitive touchpad of claim 7, wherein said conductor wiring comprises an ITO.

9. A capacitive touchpad of claim 7, wherein said insulator is transparent.

10. A capacitive touchpad integrated with mouse and handwriting functions, comprising:
    a panel for touch inputting;
    a first pattern on said panel for representing a mode switch to switch said touchpad between a mouse mode and a handwriting mode;
    a plurality of regions defined on said panel; and
    a plurality of second patterns on said plurality of regions for operation in said mouse and handwriting modes;
    wherein said panel comprises:
       a substrate selected from the group consisting of PCB, membrane and transparent plate;
       a conductor wiring on said substrate; and
       an insulator covered on said conductor wiring.

11. A capacitive touchpad of claim 10, wherein said conductor wiring comprises an ITO.

12. A capacitive touchpad of claim 10, wherein said insulator is transparent.

* * * * *

(12) INTER PARTES REEXAMINATION CERTIFICATE (614th)
United States Patent
Chiu et al.

(10) Number: US 7,274,353 C1
(45) Certificate Issued: Jun. 6, 2013

(54) CAPACITIVE TOUCHPAD INTEGRATED WITH KEY AND HANDWRITING FUNCTIONS

(75) Inventors: Yen-Chang Chiu, Taipei (TW); Ting-Hao Yeh, Tainan (TW); Yung-Lieh Chien, Taoyuan (TW); Shih-Chi Lin, Madou Township, Tainan County (TW)

(73) Assignee: Elan Microelectronics Corporation, Hsin-Chu (TW)

Reexamination Request:
No. 95/000,632, May 11, 2011

Reexamination Certificate for:
Patent No.: 7,274,353
Issued: Sep. 25, 2007
Appl. No.: 10/668,352
Filed: Sep. 24, 2003

(51) Int. Cl.
*G06F 3/44* (2006.01)

(52) U.S. Cl.
USPC ........... 345/156; 345/173; 345/174; 345/178; 345/179

(58) Field of Classification Search
None
See application file for complete search history.

(56) References Cited

To view the complete listing of prior art documents cited during the proceeding for Reexamination Control Number 95/000,632, please refer to the USPTO's public Patent Application Information Retrieval (PAIR) system under the Display References tab.

*Primary Examiner* — M. Sager

(57) ABSTRACT

A capacitive touchpad integrated with key and handwriting functions is provided for operation in key, handwriting and mouse modes. Several regions are defined on the panel of the touchpad and have several patterns printed thereon for the operation modes thereby. In the key mode, the key patterns among the printed patterns simulate a keyboard. In the handwriting mode, the handwriting region among the defined regions serves to handwriting input. In the mouse mode, the defined regions provide a cursor moving region and a horizontal and vertical scroll bars for input operations.

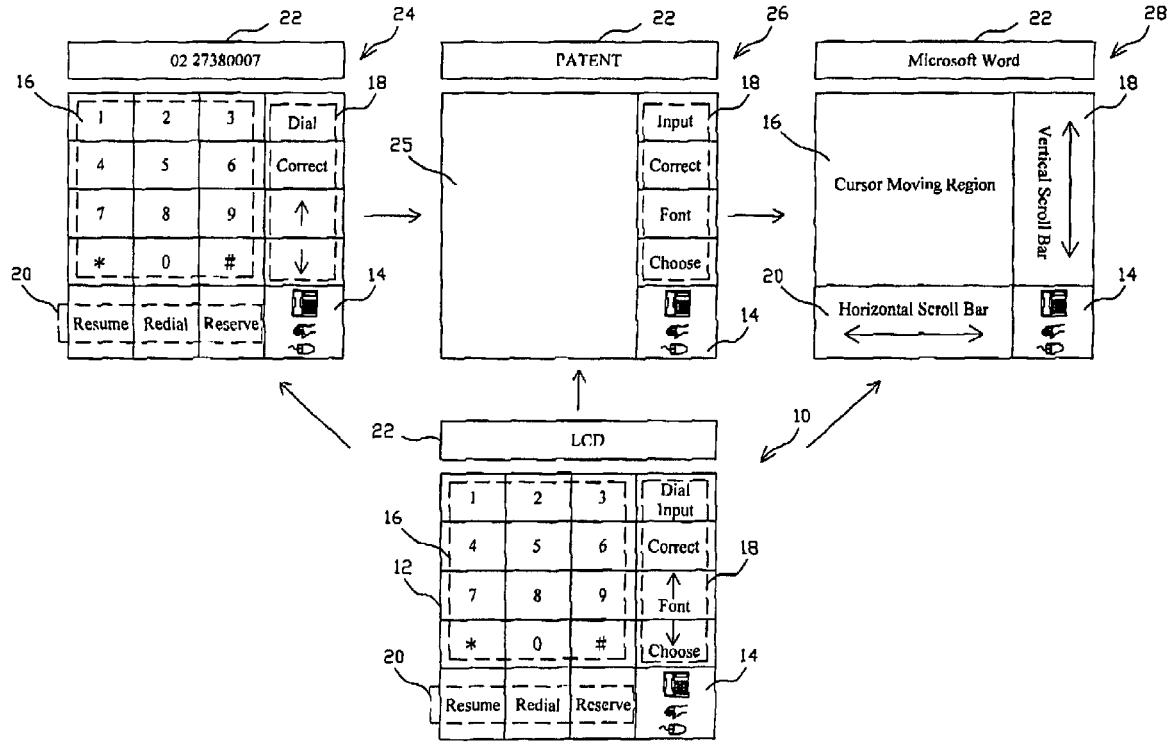

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-12 are cancelled.

\* \* \* \* \*